United States Patent
Hirabayashi (10) Patent No.: US 6,692,707 B1
(45) Date of Patent: Feb. 17, 2004

(54) HYDROCARBON FUEL REFORMER

(75) Inventor: Takeshi Hirabayashi, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/499,440

(22) Filed: Feb. 7, 2000

(30) Foreign Application Priority Data

Mar. 3, 1999 (JP) ............................. 11-055945

(51) Int. Cl.⁷ ............................. B01J 8/02; B01J 35/02
(52) U.S. Cl. ................... 422/222; 422/171; 422/176; 422/177; 422/179; 422/180; 422/190; 422/191; 422/193; 422/211; 48/61; 48/62 R; 48/89; 48/119
(58) Field of Search ............................. 48/61, 62 R, 89, 48/119, 197 R, 198.7; 422/168, 169, 170, 171, 176, 177, 179, 180, 188, 189, 190, 191, 193, 211, 220, 221, 222; 502/439

(56) References Cited

U.S. PATENT DOCUMENTS

| | | | | |
|---|---|---|---|---|
| 3,986,840 A | * | 10/1976 | Cocchiara et al. | 422/171 |
| 4,134,860 A | * | 1/1979 | Hindin et al. | 502/327 |
| 4,844,837 A | * | 7/1989 | Heck et al. | 252/373 |

FOREIGN PATENT DOCUMENTS

| | | |
|---|---|---|
| DE | 44 23 587 C2 | 1/1996 |
| DE | 44 23 587 A1 | 1/1996 |
| DE | 197 27 841 A1 | 1/1999 |
| DE | 197 21 630 C1 | 2/1999 |
| DE | 198 58 974 A1 | 6/2000 |
| EP | 0 303 438 A2 | 2/1989 |
| JP | A-58-219945 | 12/1983 |
| JP | A-4-313339 | 11/1992 |
| JP | A-6-31165 | 2/1994 |
| JP | A-7-187605 | 7/1995 |

* cited by examiner

Primary Examiner—Jerry D. Johnson
Assistant Examiner—Basia Ridley
(74) Attorney, Agent, or Firm—Oliff & Berridge, PLC (57) ABSTRACT

Monolith catalyst 42 is disposed in the reaction layer 40 of reformer 20, the monolith catalyst 42 carrying a copper-zinc catalyst which accelerates a water vapor reforming reaction and an oxidation reaction of methanol on a monolith carrier with a ratio of the length to the diameter between 5 and 18, more preferably 8 and 15, 600 to 3400 cells per square inch, more preferably 900 to 3000 cells per square inch, and formed from ceramics of low thermal conductivity at the region within 15 mm from the flow-in end of the mixture gas and from a metal of high thermal conductivity at the other portions. As a result, the degree of freedom of design and the efficiency of the water vapor reforming reaction can both be improved.

15 Claims, 5 Drawing Sheets

HYDROCARBON FUEL REFORMER

BACKGROUND OF THE INVENTION

1. Field of the Invention

The present invention generally relates to a hydrocarbon fuel reformer and more particularly to a reformer for reforming hydrocarbon fuel to a hydrogen-containing gas.

2. Description of the Prior Art

Conventionally, it has been proposed to use a type of reformer which is filled with alumina pellets carrying a partial oxidation reaction catalyst for oxidizing a portion of hydrocarbon fuel and other alumina pellets carrying a water vapor reforming reaction catalyst for reforming hydrocarbon fuel to hydrogen-containing gas with water vapor (Japanese Patent Laid-Open Publication No. Hei 4-313339 etc.). In this type of reformer, by filling one reaction layer with both alumina pellets carrying partial oxidation reaction catalyst and alumina pellets carrying water vapor reforming reaction catalyst, the necessary heat for the water vapor reforming reaction, which is an endothermic reaction, is obtained by oxidizing a portion of the hydrocarbon fuel to efficiently perform the water vapor reforming reaction. When methanol is used as the hydrocarbon fuel, the water vapor reforming reaction is represented by equation 1 and the partial oxidation reaction is represented by equations 2 to 4. In addition, reactions represented by equations 5 and 6 may also be present in the reformer.

$$CH_3OH + H_2O \rightarrow CO_2 + 3H_2 \quad (1)$$

$$CH_3OH + 1.5O_2 \rightarrow CO_2 + 2H_2O \quad (2)$$

$$CH_3OH + 0.5O_2 \rightarrow CO_2 + 2H_2 \quad (3)$$

$$CH_3OH + O_2 \rightarrow CO + 2H_2O \quad (4)$$

$$CO_2 + H_2 \rightarrow CO + H_2O \quad (5)$$

$$H_2 + 0.5O_2 \rightarrow H_2O \quad (6)$$

However, because these reformers were filled with alumina pellets carrying the catalysts, there was a problem that the area and resistance of flow path for the gas which affect the reaction efficiency of the oxidation reaction and water vapor reforming reaction of hydrocarbon fuel cannot be freely designed. This problem can be solved to some extent by considering the shape and size of alumina pellets, but the degree of freedom is still limited.

SUMMARY OF THE INVENTION

One of the objectives of a hydrocarbon fuel reformer according to the present invention is to increase the degree of freedom of the design of the reformer with respect to area and resistance of flow path of the gas which affect the reaction efficiency of the oxidation reaction and water vapor reforming reaction of hydrocarbon fuel. Another objective of the hydrocarbon fuel reformer of the present invention is to increase the reaction efficiency of the water vapor reforming reaction.

In order to solve at least some of the objectives mentioned above, the present invention employs the following.

A hydrocarbon fuel reformer according to the present invention is a reformer for reforming hydrocarbon fuel to hydrogen-containing gas, comprising a monolith catalyst carrying a partial oxidation reaction catalyst for oxidizing a portion of the hydrocarbon fuel and a water vapor reforming reaction catalyst for reforming the hydrocarbon fuel to the hydrogen-containing gas using water vapor on a monolith carrier formed from a plurality of cells which separates a gas flow path into a plurality of paths.

In the hydrocarbon fuel reformer of the present invention, because the monolith catalyst is formed by carrying a partial oxidation reaction catalyst for oxidizing a portion of the hydrocarbon fuel and water vapor reforming reaction catalyst for reforming hydrocarbon fuel to hydrogen-containing gas using water vapor on a monolith carrier formed from a plurality of cells for separating a gas flow path into a plurality of paths, by considering the cell shape and cell size, the degree of freedom of the design with respect to the area and resistance of the flow path of gas which affect the reaction efficiency can be improved compared to reformers filled with pellets carrying the catalysts.

In the hydrocarbon fuel reformer of the present invention, the partial oxidation reaction catalyst and the water vapor reforming reaction catalyst can be copper-zinc catalysts. The copper-zinc catalysts act both as a partial oxidation reaction catalyst and a water vapor reforming reaction catalyst, allowing simultaneous carriage of both the partial oxidation reaction catalysts and the water vapor reforming reaction catalysts on the monolith carrier.

In the hydrocarbon fuel reformer of the present invention, the monolith carrier can be a carrier formed from 600 to 3400 cells per square inch and more preferably, it can be formed from 900 to 3000 cells per square inch. In this manner, the water vapor reforming reaction can be performed more efficiently.

Moreover, in the hydrocarbon fuel reformer of the present invention, the monolith catalyst can be formed with the ratio of the length of the gas flow path to the cross sectional diameter of the gas flow path between 5 and 18, and more preferably, it can be formed with the ratio of the length of the gas flow path to the cross sectional diameter of the gas flow path between 8 and 15. In this manner, the water vapor reforming reaction can be performed more efficiently.

In the hydrocarbon fuel reformer of the present invention, the monolith carrier can be formed so that the cross sectional shape of the plurality of cells is a hexagon. In this manner, the water vapor reforming reaction can be performed more efficiently.

Furthermore, in the hydrocarbon fuel reformer of the present invention, the monolith carrier can be formed with at least the flow-in section of the gas flow path formed from a material with low thermal conductivity or from a material with lower thermal conductivity than the other portions. In this manner, the water vapor reforming reaction can be performed more efficiently. In the hydrocarbon fuel reformer of this aspect of the present invention, the monolith carrier can be formed with 2 to 20% of the length of the gas flow path from the flow-in end formed by a material of low thermal conductivity and other portions formed by a material of higher thermal conductivity than the material forming the flow-in end.

In addition, in the hydrocarbon fuel reformer of the present invention, the hydrocarbon fuel can be methanol and the reformer can comprise a methanol supplier for supplying methanol to the monolith catalyst and an oxygen-containing gas supplier for supplying oxygen-containing gas to the monolith catalyst so that the molar ratio of the oxygen atom to the supplied methanol molecule is between 0.1 to 0.42. In this manner, necessary heat for the water vapor reforming reaction can be efficiently obtained from the partial oxidation reaction.

With the hydrocarbon fuel reformer according to one aspect of the present invention which uses methanol as the hydrocarbon fuel, the hydrocarbon fuel reformer can further comprise a water vapor supplier for supplying the water vapor to the monolith catalyst so that the molar ratio of the water molecule to the methanol molecule is at least 1.0. In this manner, the water vapor reforming reaction can be performed more efficiently.

Moreover, with the hydrocarbon fuel reformer according to one aspect of the present invention which uses methanol as the hydrocarbon fuel, the partial oxidation reaction catalyst and the water vapor reforming reaction catalyst can be copper-zinc catalyst. The monolith carrier can be a carrier formed from 900 to 3000 cells per square inch. The monolith catalyst can be formed to make the ratio between the length of the gas flow path and the cross sectional diameter of the gas flow path between 8 and 15. The monolith carrier can be formed by using a material with a low thermal conductivity for 2 to 20% of the length of the gas flow path from the gas flow-in end and a material with a higher thermal conductivity than the material used for the section from the gas flow-in end for the other portions.

DESCRIPTION OF PREFERRED EMBODIMENTS

Figure 1:
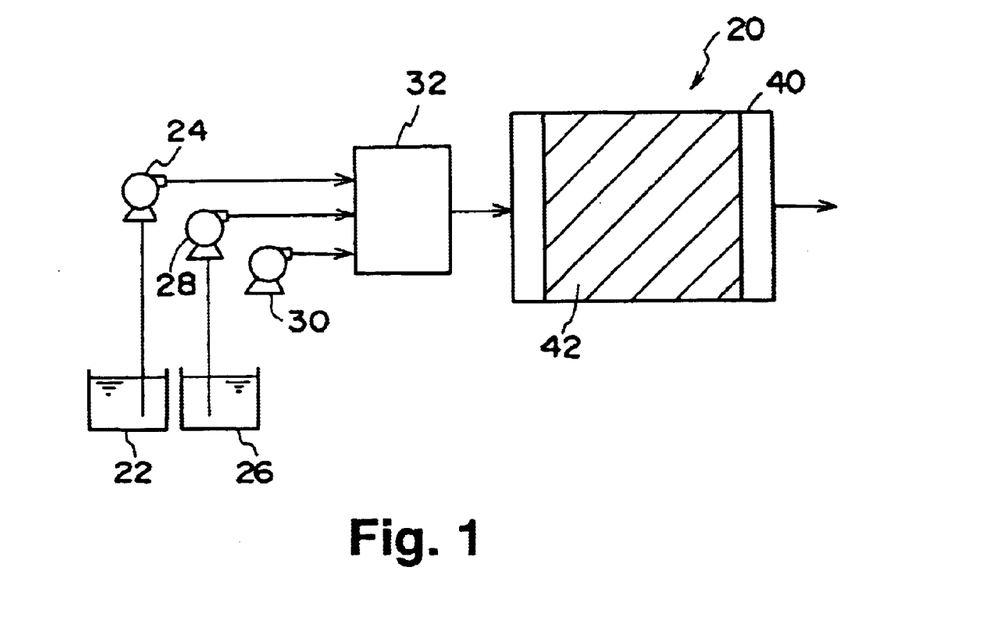
FIG. 1 is a structural figure diagrammatically showing the structure of the hydrocarbon fuel reformer 20 of one embodiment of the present invention.

The preferred embodiments of the present invention are described next. FIG. 1 is a structural figure diagrammatically showing the structure of hydrocarbon fuel reformer 20 according to one embodiment of the present invention.

As shown, the reformer 20 of this embodiment comprises a reaction layer 40 having a monolith catalyst 42 which carries a partial oxidation reaction catalyst for oxidizing methanol and a water vapor reforming reaction catalyst for reforming methanol to hydrogen-containing gas using water vapor. The reaction layer 40 is supplied with methanol from a methanol tank 22 by a methanol pump 24 and water from a water tank 26 by a water pump 28, both methanol and water being vaporized by a vaporizer 32. The reaction layer 40 is also supplied with air containing oxygen for acting as a oxidation gas by a blower 30.

Figure 2:
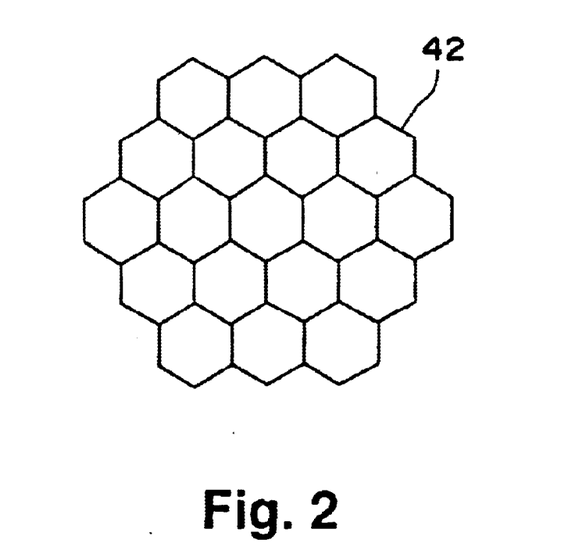
FIG. 2 is a cross sectional view showing a portion of cross sectional structure of the monolith catalyst 42.

The monolith catalyst 42 provided at the reaction layer 40 is formed so that the cross sectional shape is a honeycomb shape having a plurality of hexagonal cells as shown in FIG. 2 and a copper-zinc catalyst acting both as the catalyst for water vapor reforming reaction represented by equation 1 and as the catalyst for the partial oxidation reaction represented by equations 2 to 4 is carried on the surface. In this embodiment, the monolith catalyst 42 is formed to be a cylinder with a ratio of the length L to the diameter D (L/D) between 5 and 18 and more preferably between 8 and 15. Also, the monolith catalyst 42 is formed so that it has 600 to 3400 cells per square inch and more preferably 900 to 3000 cells per square inch. The flow-in end section (the section approximately 15 mm from the flow-in end) for the mixture gas is formed by a ceramics with a low thermal conductivity and at the same time, the other sections are formed from a metal with a high thermal conductivity. Copper-zinc catalyst is coated on the surface in an amount of 240 g per liter. The catalyst is produced as follows. First a solution of sodium carbonate is dropped into solutions of nitrate salts of copper, zinc, and aluminum to precipitate hydroxides of each of copper, zinc, and aluminum, and a combined hydroxide of zinc and aluminum. These are then calcinated so that they become oxides of respective metal. Water is added to these oxides to shape them into slurry form and the oxides are carried. Aluminum is not used as a catalyst but is used to improve the endurance of the catalyst. For this purpose, it is also possible to use zirconia or to use no aluminum.

Moreover, the supplied amounts of methanol, water, and air by the methanol pump 24, water pump 28, and blower 30, respectively, to the vaporizer 32 are adjusted so that the molar ratio of the water to the methanol (number of moles of water/number of moles of methanol) of the mixture gas of methanol, water vapor, and air supplied to the reaction layer 40 is greater than 1.0 and the molar ratio of the oxygen to methanol (number of moles of oxygen atom/number of moles of methanol) of the mixture gas is between 0.1 and 0.42.

Figure 3:
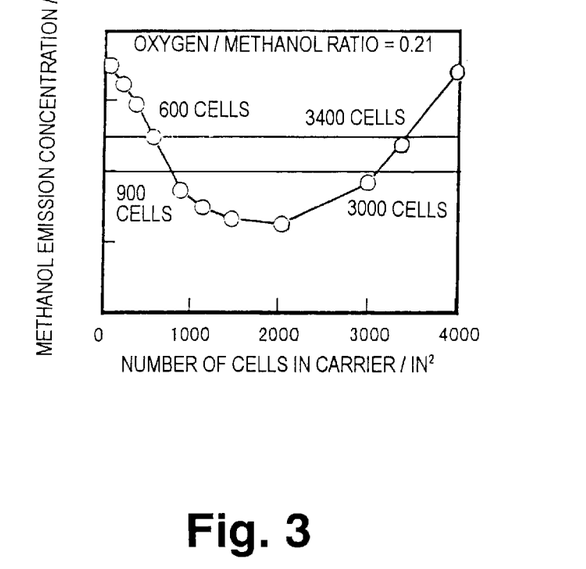
FIG. 3 is a graph showing the effect of the number of cells per square inch of the monolith catalyst 42 on the water vapor reforming reaction of methanol.

The performance of the reformer 20 of the present embodiment thus constructed is described next. FIG. 3 is a graph showing the effect of the number of cells per square inch of the monolith catalyst 42 on the water vapor reforming reaction of methanol. For comparison, monolith catalysts with number of cells per square inch being 100, 200, 400, and 4000, respectively, are used with the other conditions being identical to the monolith catalyst 42 of the present embodiment. As the monolith catalyst 42 of the embodiment, a monolith catalyst in the shape of a cylinder with a diameter of 120 mm and length of 600 mm is used. As the mixture gas, a gas with flow rate of 7 mol/min for methanol, 14 mol/min for water, and a flow rate of air corresponding to a molar ratio of oxygen atom to methanol of 0.21 is used with the temperature when the gas flows into the reaction layer being 330° C. As shown in the figure, the reformer 20 of the present embodiment has lower methanol concentration (referred to as methanol emission concentration in the figure), and therefore higher methanol reforming efficiency, at the exit of the reaction layer 40 compared to the comparison example. In particular, when the cell number per square inch is set between 900 and 3000, the performance is significantly improved. The actual number of cells per square inch for monolith catalyst 42 will be determined, within a range of 600 to 3400, by the permitted methanol concentration of devices (for example, fuel cells or hydrogen engine) which receive the hydrogen-containing gas obtained from reforming and the production cost of the reformer 20.

The effects of the component of the mixture gas supplied to the reaction layer 40 and the temperature are as follows. When the amount of methanol is increased in the mixture gas, the methanol emission concentration tends to increase both for the present embodiment and for the comparison examples. This is due to the fact that the amounts of methanol on the left side of the equation 1 and equations 2 to 4 increase. The present embodiment shows improved performance even in such a case. The effect of the amount of methanol also applies for all of the following comparisons.

When the amount of water vapor (amount of water) is increased in the mixture gas, the methanol emission concentration tends to decrease both for the embodiment and for the comparison examples. This is due to the fact that the amount of water on the left side of the equation 1 increases so that the reaction is accelerated. The present embodiment shows improved performance even in such a case. The effect of the amount of water also applies for all of the following comparisons. As can be seen from equation 1, when the molar ratio of water to methanol is less than 1.0, unreacted methanol will be present and the emitted methanol concentration will be increased. Therefore, in order to improve the efficiency of water vapor reforming of methanol, this ratio is preferably set at a value greater than or equal to 1.0.

When the temperature of the mixture gas supplied to the reaction layer 40 is increased, the methanol emission concentration tends to decrease both for the embodiment and for the comparison examples. This is due to the fact that the reaction represented by equation 1 is an endothermic reaction. The present embodiment shows improved performance even in such a case. The effect of the temperature of the mixture gas also applies to all of the following comparisons.

Figure 4:
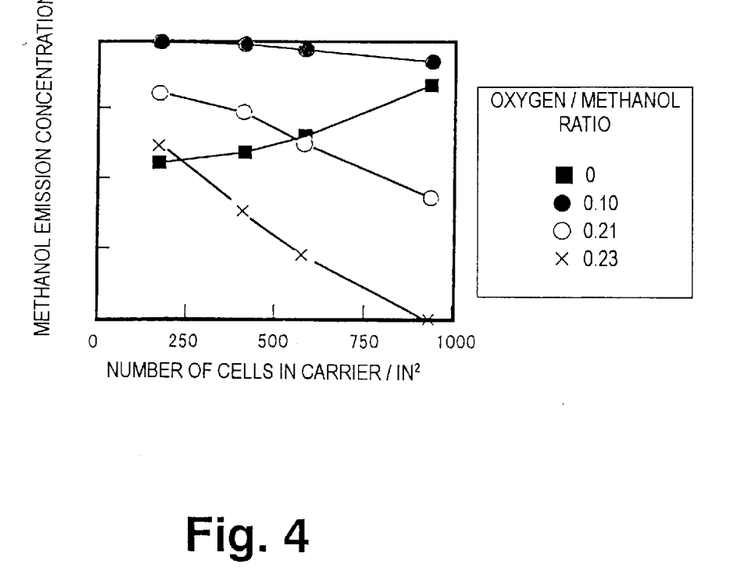
FIG. 4 is a graph showing the effect of the amount of oxygen in the mixture gas on the water vapor reforming reaction of methanol.

A graph showing effects of the amount of oxygen within the mixture gas on the water vapor reforming reaction of methanol is shown in FIG. 4. In order to obtain this graph, the same monolith catalyst 42 as is used to obtain the graph shown in FIG. 3 is used, and for the mixture gas, the mixture gas used to obtain the graph of FIG. 3 is used with the amount of oxygen varied. As shown in the figure, the performance of the reformer 20 improves as the amount of oxygen in the mixture increases. With the mixture having no oxygen present, the performance decreases as the number of cells per square inch increases, and therefore, this mixture is not suited for the reformer 20 of the present embodiment. From this graph, it can be seen that the molar ratio of oxygen atoms to methanol is preferably 0.1 or greater. From the viewpoint of the objective of the reformer 20 of the present embodiment to obtain hydrogen-containing gas, this ratio should preferably be 0.42 or less. When this ratio is increased so as to exceed 0.42, the efficiency of generation of hydrogen-containing gas decreases and hydrogen-containing gas rich in hydrogen can no longer be obtained with sufficient efficiency to be practical.

Figure 5:
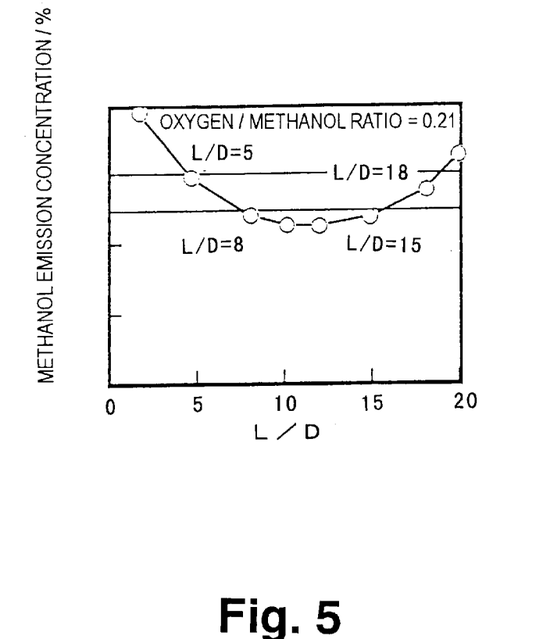
FIG. 5 is a graph showing the effect of the ratio of the length L to the diameter D (L/D) of the monolith catalyst 42 on the water vapor reforming reaction of the methanol.

FIG. 5 is a graph showing effects of the ratio L/D between the length L and the diameter D of the monolith catalyst on the water vapor reforming reaction of methanol. For this graph, the same monolith catalyst as in the graph of FIG. 3 is used with the number of cells per square inch of the monolith catalyst 42 set at 900 and ratio of the length L to the diameter D varied. The same mixture gas as in the graph of FIG. 3 is used. For comparison, monolith catalysts having ratio L/D of 2 and 20 are used. As shown in the figure, the reformer 20 of the present embodiment has lower methanol concentration, and thus better methanol reforming efficiency, at the exit of the reaction layer 40 compared to the comparison examples. In particular, the performance is significantly improved for monolith catalysts having the ratio L/D between 8 and 15. The actual ratio of length to the diameter of the monolith catalyst 42 is determined, from a range of 5 to 18, by the permitted methanol concentration of the device (for example, fuel cells or hydrogen engine) which receives the hydrogen-containing gas obtained from reforming, the production cost of the reformer 20, and the space limitation of the location in which the reformer 20 is placed.

Figure 6:
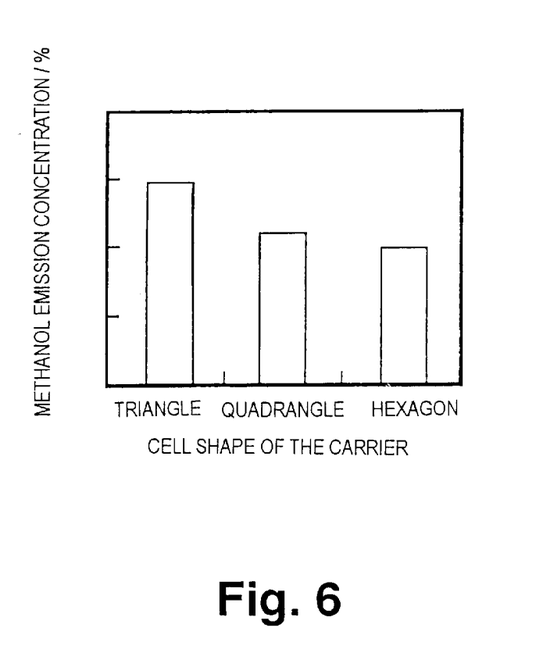
FIG. 6 is a graph showing the effect of the shape of the cell of the monolith 42 on the water vapor reforming reaction of methanol.

FIG. 6 is a graph showing effects of the shape of the cell of the monolith catalyst 42 on the water vapor reforming reaction of methanol. For this graph, the same monolith catalyst 42 as in FIG. 3 is used with the number of cells per square inch of 900 and its shape varied. For the mixture gas, the same mixture gas used to obtain the graph shown in FIG. 3 is used. For comparison, monolith catalysts having cell shapes of a triangle and a quadrangle are used. As shown in the figure, the reformer 20 of the present embodiment has lower methanol concentration, and thus better methanol reforming efficiency, at the exit of the reaction layer 40 compared to the comparison examples. This is due to the fact that with the hexagonal cells, the distance from the center of the flow path to the walls where the catalysts are carried does not vary as much as with the cells having a triangle shape or a quadrangle shape, and therefore the reaction on the catalyst are performed more evenly.

Figure 7:
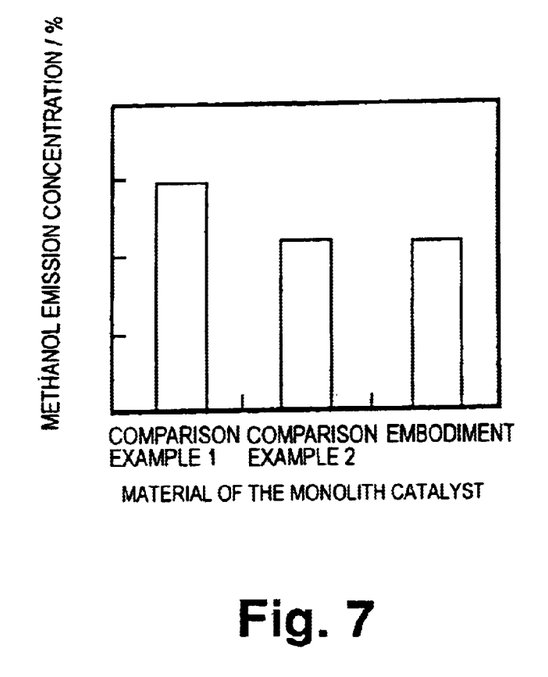
FIG. 7 is a graph showing the effect of the material of the monolith catalyst 42 on the water vapor reforming reaction of methanol.
Figure 8:
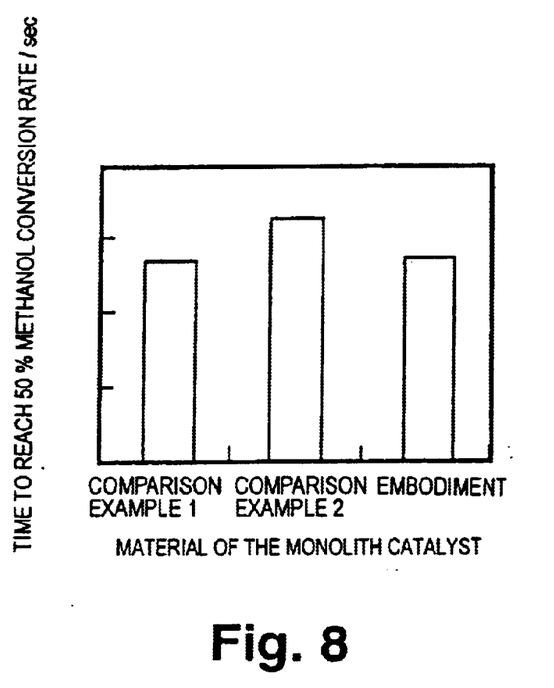
FIG. 8 is a graph showing a relationship between the material of the monolith catalyst 42 and the time required to convert 50% of methanol from the start of the reformer 20 (warm up performance).

FIG. 7 is a graph showing effects of the material of the monolith catalyst 42 on the water vapor reforming reaction of methanol. FIG. 8 is a graph showing one example of relationship between the material of the monolith catalyst 42 and the time required for the reformer 20 to convert 50% of methanol from the start of the reformer (warm up performance). To obtain these graphs, the same monolith catalysts 42 as in FIG. 3 with a diameter of 200 mm, length of 300 mm, and number of cells per square inch of 900 are used. The same mixture gas as FIG. 3 is used. As a first comparison example, a monolith carrier formed from a metal having a high thermal conductivity is used and as a second comparison example, a monolith carrier formed from a ceramics having a low thermal conductivity is used. As shown in FIG. 7, the reformer 20 of the present embodiment has lower methanol concentration at the exit of the reaction layer 40 and better reforming efficiency of methanol than the first comparison example, and equivalent performance compared to the second comparison example. On the other hand, as shown in FIG. 8, the reformer 20 of the present invention has equivalent warm up performance as the first comparison example, which is better than the warm up performance of the second comparison example. From the FIGS. 7 and 8, it can be seen that the reformer 20 of the present embodiment has high methanol reforming efficiency and good warm up performance.

Figure 9:
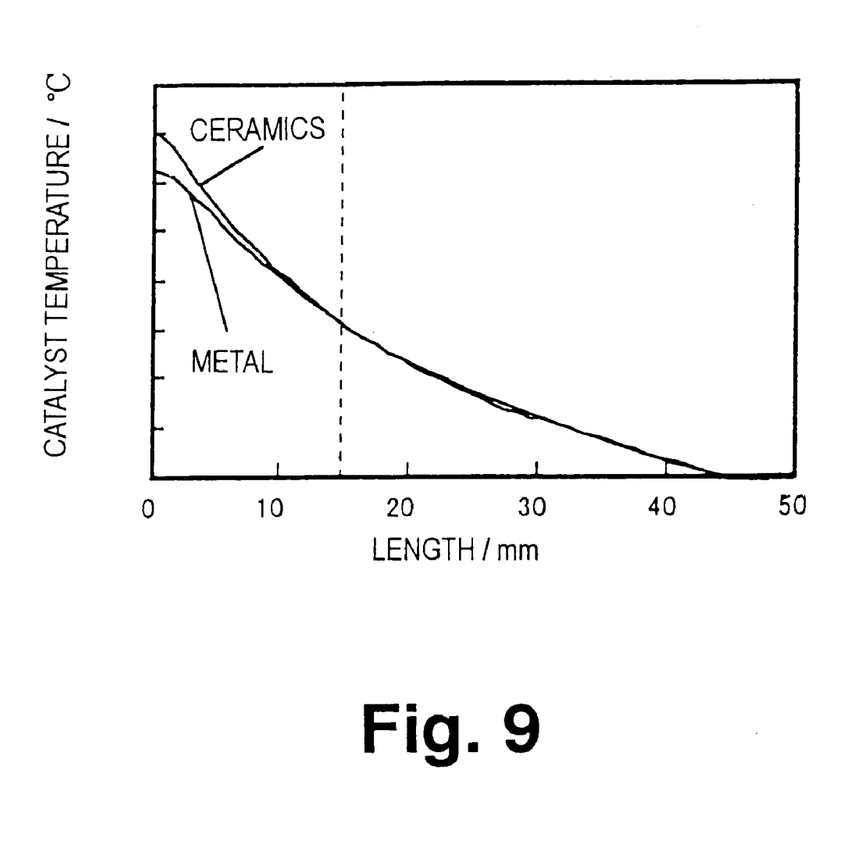
FIG. 9 is a graph showing effects of the material of the monolith catalyst on the catalyst temperature at positions in the axial direction of the monolith catalyst.

FIG. 9 is a graph showing effects of the material of the monolith catalyst on the catalyst temperature at positions in the axial direction of the monolith catalyst. As shown in the figure, the monolith catalyst formed from ceramics has higher temperature than the monolith catalyst formed from metal in a region within 10 mm from the flow-in end of the mixture gas. This is due to the fact that the heat around the flow-in end is diffused to the back in the monolith catalyst formed from metal. Because the water vapor reforming reaction of the methanol represented by equation 1 is an endothermic reaction, the reactivity, as explained for effects of the temperature of the mixture gas on the reactivity, improves when the temperature of the mixture gas is increased. The differences among the first comparison example, the embodiment, and the second example can be considered to be due to the temperature around the flow-in end of the monolith catalyst for the mixture gas, as shown in FIG. 9. From these facts, by forming the monolith catalyst by a material of low thermal conductivity (for example ceramics) at the region from 2% to 20%, preferably from 2% to 5%, of the entire length from the flow-in end and by a material of high thermal conductivity (for example metal such as stainless steel) at other portions, the methanol reforming efficiency can be improved, and at the same time, the warm up performance can be improved.

With the reformer 20 of the present embodiment as described, by using a monolith catalyst 42 carrying a catalyst on the monolith carrier, the degree of freedom of design of the area and resistance of the flow path of the mixture gas which affect the reaction efficiencies of water vapor reforming reaction and partial oxidation reaction of methanol can be improved, and at the same time, the reaction efficiency of the water vapor reforming reaction can be improved.

Also, with the reformer 20 of the present embodiment, by using a monolith catalyst having the number of cells per square inch between 600 to 3400, and more preferably between 900 and 3000, the reaction efficiency of the water vapor reforming reaction of methanol can be improved. Furthermore, by adjusting the molar ratio of oxygen atom to methanol in the mixture gas to be between 0.1 and 0.42, the reaction efficiency of the water vapor reforming reaction of methanol can be improved, and at the same time, hydrogen-containing gas rich in hydrogen can be obtained. With the reformer 20 of the present embodiment, by using a monolith catalyst 42 having the ratio of length L to the diameter D (L/D) between 5 and 18, and more preferably 8 and 15, the reaction efficiency of the water vapor reforming reaction of methanol can be improved. With the reformer 20 of the present embodiment, by using a monolith catalyst 42 of hexagonal shape, the reaction efficiency of the water vapor reforming reaction of methanol can be improved. In addition, with the reformer 20 of the present embodiment, by using a material of a lower thermal conductivity to form the region from 2% to 20%, and more preferably 2% to 5%, from the flow-in end of the mixture gas and a material of a higher thermal conductivity to form other portions of the gas flow path, the reforming efficiency of methanol can be improved, and at the same time, the warm up performance can be improved.

For the reformer 20 of the present embodiment, the monolith catalyst 42 is formed to have all of the number of cells per square inch, ratio of length L to diameter D, cross sectional shape of the cell, and material appropriate for improving the reaction efficiency of the water vapor reforming reaction of methanol. However, it is also possible to form the monolith catalyst 42 with one or more of the structural characteristics being out of the described ranges. In such a case, the structural characteristic which is out of the described range will determine how much the performance degrades.

In the reformer 20 of the present embodiment, methanol is used as hydrocarbon fuel, but other hydrocarbons, for example, hydrocarbon such as methane, or alcohol such as ethanol can also be used.

In the reformer 20 of the present embodiment, methanol is supplied to the reaction layer 40 as a mixture gas mixed with water and air at the vaporizer 32, but it is also possible to supply vaporized methanol, water vapor, and air directly to the reaction layer 40 without providing the vaporizer 32.

The preferred embodiments of the present invention have been described, but this description is hot intended for limiting the scope of the invention, and variations and modifications can be realized within the spirit and scope of the invention.

What is claimed is:

1. A reformer for reforming hydrocarbon fuel into hydrogen-containing gas, comprising
   a monolith catalyst carrying a partial oxidation reaction catalyst for oxidizing a portion of said hydrocarbon fuel and a water vapor reforming reaction catalyst for reforming said hydrocarbon fuel into said hydrogen-containing gas using water vapor on a monolith carrier formed from a plurality of cells which separates flow path of gas into a plurality of paths, wherein
   said monolith carrier for said gas is formed from a material of lower thermal conductivity for a flow-in end section than a material used to form other portions.

2. A reformer of claim 1, wherein
   said partial oxidation reaction catalyst and said water vapor reforming reaction catalyst are copper-zinc catalyst.

3. A reformer of claim 1, wherein
   said monolith carrier is a carrier formed from 600 to 3400 cells per square inch.

4. A reformer of claim 1, wherein
   said monolith carrier is a carrier formed from 900 to 3000 cells per square inch.

5. A reformer of claim 1, wherein
   said monolith catalyst is formed to have a ratio of the length of said flow path to the diameter of the cross section of said flow path between 5 and 18.

6. A reformer of claim 1, wherein
   said monolith catalyst is formed to have a ratio of the length of said flow path to the diameter of the cross section of said flow path between 8 and 15.

7. A reformer of claim 1, wherein
   said monolith carrier is formed so that the cross sectional shape of said plurality of cells is a hexagon.

8. A reformer of claim 1, wherein
   said monolith carrier for said gas is formed from a material of low thermal conductivity for the flow-in end section.

9. A reformer of claim 1, wherein
   said monolith carrier is formed from a material of low thermal conductivity at a region of 2% to 20% from the flow-in end of said gas flow path and from another material of higher thermal conductivity than said material forming said region at other portions.

10. A reformer of claim 1, wherein
   said hydrocarbon fuel is methanol, said reformer further comprising,
   a methanol supplier for supplying methanol to said monolith catalyst, and
   an oxygen-containing gas supplier for supplying oxygen-containing gas to said monolith catalyst so that the molar ratio of oxygen atom to the methanol molecule is between 0.1 and 0.42.

11. A reformer of claim 10 further comprising
a water vapor supplier for supplying said water vapor to said monolith catalyst so that the molar ratio of water molecule to methanol molecule supplied to said monolith catalyst by said methanol supplier is greater than 1.0.

12. A reformer of claim 11, wherein
said partial oxidation reaction catalyst and said water vapor reforming reaction catalyst are copper-zinc catalyst.

13. A reformer of claim 11, wherein
said monolith carrier is formed from 900 to 3000 cells per square inch.

14. A reformer of claim 11, wherein
said monolith catalyst is formed to have a ratio of the length of said flow path to the diameter of the cross section of said flow path between 8 and 15.

15. A reformer of claim 11, wherein
said monolith carrier is formed from a material of lower thermal conductivity at a region of 2% to 20% from the flow-in end of said gas flow path and from another material of higher thermal conductivity than said material forming said region at the other portions.

* * * * *